United States Patent
Qu et al.

(10) Patent No.: US 11,304,158 B2
(45) Date of Patent: Apr. 12, 2022

(54) SIGNAL TRANSMISSION METHOD FOR MULTI-ANTENNA MULTI-USER TIME DIVISION DUPLEX COMMUNICATION SYSTEM

(71) Applicant: Shanghai Taolink Technologies Corporation, Shanghai (CN)

(72) Inventors: Daiming Qu, Wuhan (CN); Hao Jiang, Wuhan (CN); Zhibing Wang, Wuhan (CN); Hui He, Wuhan (CN); Jingshun Liu, Wuhan (CN)

(73) Assignee: SHANGHAI TAOLINK TECHNOLOGIES CORPORATION, Shanghai (CN)

( * ) Notice: Subject to any disclaimer, the term of this patent is extended or adjusted under 35 U.S.C. 154(b) by 57 days.

(21) Appl. No.: 16/757,954

(22) PCT Filed: Oct. 10, 2018

(86) PCT No.: PCT/CN2018/109678
§ 371 (c)(1),
(2) Date: Apr. 21, 2020

(87) PCT Pub. No.: WO2019/095892
PCT Pub. Date: May 23, 2019

(65) Prior Publication Data
US 2020/0305100 A1    Sep. 24, 2020

(30) Foreign Application Priority Data
Nov. 17, 2017    (CN) .......................... 201711147904.7

(51) Int. Cl.
*H04W 56/00* (2009.01)
*H04B 7/0452* (2017.01)
(Continued)

(52) U.S. Cl.
CPC ........ *H04W 56/001* (2013.01); *H04B 7/0452* (2013.01); *H04B 7/0617* (2013.01);
(Continued)

(58) Field of Classification Search
CPC ............ H04W 56/001; H04W 72/0446; H04B 7/0452; H04B 7/0617; H04B 17/318; H04L 5/0051; H04L 5/1469
See application file for complete search history.

(56) References Cited

U.S. PATENT DOCUMENTS

| | | | | |
|---|---|---|---|---|
| 2004/0214582 A1* | 10/2004 | Lan | ....................... | H04W 72/02 455/452.2 |
| 2006/0035660 A1* | 2/2006 | Anderson | ............. | H04W 52/06 455/522 |

(Continued)

FOREIGN PATENT DOCUMENTS

| CN | 1444348 A | 9/2003 |
|---|---|---|
| CN | 101267611 A | 9/2008 |

(Continued)

OTHER PUBLICATIONS

PCT/CN2018/109678—International Search Report, dated Dec. 29, 2018, 2 pages.
(Continued)

*Primary Examiner* — Huy D Vu
*Assistant Examiner* — Robert Ma
(74) *Attorney, Agent, or Firm* — Getech Law LLC; Jun Ye (57) ABSTRACT

Disclosed in the present invention is a signal transmission method for a multi-antenna multi-user TDD communication system. Each frame of the TDD communication system includes one forward downlink frame synchronization signal, multiple downlink data time slots, and multiple uplink data time slots; the downlink frame synchronization signal is
(Continued)

a broadcast signal, the base station sends the downlink frame synchronization signal to all terminals, and after each terminal receives the downlink frame synchronization signal, time and frequency synchronization is performed with reference to the base station to acquire the start time and end time of each uplink data time slot. The synchronization signal received power P is evaluated and compared with the synchronization signal received power range of all uplink data time slots in the frame, and all terminals falling into the synchronization signal received power range of the uplink data time slot k select the uplink data time slot k to send data.

9 Claims, 3 Drawing Sheets

(51) Int. Cl.
*H04B 7/06* (2006.01)
*H04L 5/00* (2006.01)
*H04L 5/14* (2006.01)
*H04W 72/04* (2009.01)

(52) U.S. Cl.
CPC .......... *H04L 5/0051* (2013.01); *H04L 5/1469* (2013.01); *H04W 72/0446* (2013.01)

(56) References Cited

U.S. PATENT DOCUMENTS

| | | | |
|---|---|---|---|
| 2007/0274278 | A1 | 11/2007 | Choi et al. |
| 2009/0080499 | A1* | 3/2009 | Yavuz .................. H04B 1/7107 375/144 |
| 2017/0163404 | A1* | 6/2017 | Liu .................... H04W 72/0413 |
| 2017/0331620 | A1 | 11/2017 | Tsai et al. |

FOREIGN PATENT DOCUMENTS

| | | | |
|---|---|---|---|
| CN | 103748801 A | | 4/2014 |
| CN | 107911204 A | | 4/2018 |
| EP | 2443863 A1 * | 4/2012 | ........... H04B 17/318 |

OTHER PUBLICATIONS

PCT/CN2018/109678—International Application Status Report, dated Jan. 13, 2020, 2 pages.

* cited by examiner

| Downlink frame synchronization signal | Downlink data time slot 1 | Uplink data time slot 1 | Downlink data time slot 2 | Uplink data time slot 2 | Downlink data time slot 3 | Uplink data time slot 3 |

FIG. 1

| Pilot signal | Uplink synchronization sequence | Encoded data sequence |

FIG. 2

| Downlink synchronization sequence | Encoded data sequence |

SIGNAL TRANSMISSION METHOD FOR MULTI-ANTENNA MULTI-USER TIME DIVISION DUPLEX COMMUNICATION SYSTEM

TECHNICAL FIELD

The present invention belongs to the field of wireless communication, and relates to a time division duplex wireless communication method, and more particularly, to a signal transmission method for a multi-antenna multi-user time division duplex communication system.

BACKGROUND

Time division duplex (TDD) is a communication manner of a mobile communication system, and the information sent and received between a base station and user equipment in such a manner is alternately transmitted on the same channel in the form of a burst, that is, the transmitting and receiving two parties send and receive the information in turn, which is also called as "a pingpong mode". In this way, a duplex channel can be implemented on one channel, thereby improving the spectrum efficiency. In a multi-antenna multi-user TDD system, since terminals are distributed in different positions, the distances of the terminals from the base station are also different. In order to achieve the similar received power at the base station, it is necessary for the terminal to be able to adjust the transmission power substantially. Such a process is called as power control. The existing power control technology requires the terminal to have a wide range of power adjustment capability, which will significantly increase the cost of the terminal. Therefore, a simple and effective communication method with a reduced power control range is needed.

In addition, for the multi-user communication system, the base station needs to identify the transmitting terminal and perform channel estimation on the terminal. In the prior art, the terminal is required to send a pilot signal and/or a synchronization sequence on a specified frequency and sub-channel, so that the base station can quickly identify the transmitting terminal and perform channel estimation. However, these methods demand that the terminal and the base station have very accurate frequency synchronization and a relatively high probability of collision is caused. Therefore, there is a need for a method which does not limit the transmitting frequency and sub-channel of the terminal, and can quickly identify the transmitting terminal and perform channel estimation.

SUMMARY

The object of the present invention is to provide a wireless communication system and method which are capable of effectively controlling the transmission time and frequency of a terminal. Due to the reciprocity between an uplink and a downlink in TDD base station communication, the synchronization signal received power of the terminal is approximately the signal received power of the base station for such terminal. Such method classifies the uplink time slots according to the synchronization signal received power. Different synchronization signal received power corresponds to different uplink time slots, so that the terminals with the similar received power perform the transmitting in the same time slot. In this way, each terminal only needs to realize the adjustment of the transmission power by a small amplitude, thereby reducing the implementation cost of the terminal. In addition, the terminal randomly selects a frequency to send uplink data, and the base station quickly identifies the transmitting terminal and performs channel estimation, and sends downlink data to such terminal on the same frequency.

In order to solve the above technical problems, the technical solution adopted by the present invention is as follows.

A signal transmission method for a multi-antenna multi-user TDD communication system has the characteristics that each frame of the TDD communication system comprises one forward downlink frame synchronization signal, multiple downlink data time slots, and multiple uplink data time slots; the downlink frame synchronization signal is a broadcast signal, a base station sends the downlink frame synchronization signal to all terminals, after each terminal receives the downlink frame synchronization signal, time and frequency synchronization is performed with reference to the base station, a synchronization signal received power P is evaluated simultaneously, by time synchronization, each terminal acquires the start and end time of each uplink data time slot, afterwards, according to the evaluated synchronization signal received power P, each terminal selects one uplink data time slot k to send data, wherein k is a natural number, and the specific selecting method is as follows: a lower limit for the synchronization signal received power is defined for each uplink data time slot in the frame, and the lower limit for the synchronization signal received power of the uplink data time slot k is represented by $\Gamma_k$; when $\Gamma_k$ increases as k increases, $\Gamma_k \leq P < \Gamma_{k+1}$; when $\Gamma_k$ decreases as k increases, if $P \geq \Gamma_1$, the uplink data time slot 1 is selected to send data, and if $P < \Gamma_1$, $\Gamma_k \leq P < \Gamma_{k-1}$; wherein the above $\Gamma_k$ is a predetermined constant number for each uplink data time slot in the frame, and $\Gamma_k$ is acquired by statistics and optimization by simulation or actual measurement.

Alternatively, in each uplink data time slot, multiple terminals transmit data packets to the base station, and each data packet is modulated by adopting a narrow-band single-carrier modulation manner; and the format in which the terminal transmits the data in the uplink data time slot is a pilot signal plus an uplink synchronization sequence plus an encoded data sequence, wherein the pilot signal is a single frequency signal and the uplink synchronization sequence is a sequence with good autocorrelation characteristics.

Alternatively, the uplink synchronization sequence and the encoded data sequence are both modulated by any method of MSK, GMSK, OQPSK, and π/2-BPSK.

Alternatively, the data packets transmitted between the base station and the terminals in the uplink data time slots and the downlink data time slots are both modulated by adopting a narrow-band single-carrier modulation manner, and the terminal randomly selects a center frequency to transmit uplink data, and receives the downlink data of the base station on the same center frequency.

Alternatively, the downlink frame synchronization signal is a LoRa signal, wherein LoRa is a long-range and low-power consumption wireless transmission physical layer technology developed by Semtech Company.

Alternatively, the base station detects the pilot signal sent by the terminal in the uplink data time slot, and acquires the center frequency of a sub-channel of the terminal according to the pilot signal, and the specific acquiring method is as follows: the base station performs J point FFT on the pilot signals received by all antennas and records the FFT result of the ith antenna branch as vector $S_i$, the absolute value of the FFT result of each antenna receipt is calculated and then squared, afterwards, the results of all antenna branches are added up as $$E = \sum_{i=1}^{M} \text{ABS}^2(S_i),$$

wherein $\text{ABS}^2(S_i)$ represents that the absolute values of all elements in $S_i$ are taken and then squared; then according to the threshold value set by the system, the position of the peak value in E is calculated, and is represented by $n_1$, $n_2 \ldots n_K$, wherein K is the number of detected peak values, each peak value corresponds to one terminal transmitting a signal, and then the center frequency of the sub-channel of each terminal is acquired according to the following formula $$f_k = \begin{cases} \dfrac{n_k - 1}{J} f_s, & 1 \le n_k \le \dfrac{J}{2} \\ \dfrac{J - n_k - 1}{J} f_s, & \dfrac{J}{2} + 1 \le n_k \le J \end{cases},$$

wherein $f_s$ is the system sampling rate, and the acquired center frequencies of the sub-channels of respective terminals are represented by $f_1, f_2, \ldots, f_K$.

Alternatively, the method for the base station to perform channel estimation on the terminal is as follows: according to the corresponding peak value position $n_k$ of the kth terminal in E, k=1, 2, ..., K, k is a natural number, for the FFT results $S_1, S_2, \ldots S_M$ of all antenna branches, the $n_k$ elements are taken and combined into a vector $h_k$, that is, the channel response of the terminal k to each antenna of the base station, $$h_k = \begin{bmatrix} (S_1)_{n_k} \\ (S_2)_{n_k} \\ \vdots \\ (S_M)_{n_k} \end{bmatrix},$$

the dimensions of $h_k$ are: row M and column 1, wherein M is the number of the receiving antennas of the base station, and $(S_i)_{n_k}$ represents the $n_k$th element of the vector $S_i$.

Alternatively, in the receiving process that the base station performs beamforming on the terminal, the beamforming is performed by adopting any method of conjugation beamforming, zero forcing beamforming or minimum mean square error beamforming according to the channel response of the terminal.

Alternatively, in each downlink data time slot, the base station transmits data packets to multiple terminals, each data packet is modulated by adopting a narrow-band single-carrier modulation manner, the occupied bandwidth is C and called as a sub-channel, the center frequency of the sub-channel is the center frequency of the sub-channel used by the terminal during the last uplink transmission, and the base station distinguishes the transmitted signals for multiple terminals by the center frequency of the sub-channel, and reduces the interference between the signals; and in each downlink data time slot, the data packet sent by the base station is formed by a downlink synchronization sequence and an encoded data sequence, wherein the downlink synchronization sequence is a sequence with good autocorrelation characteristics, and modulated on the center frequency of the sub-channel of the corresponding terminal.

Alternatively, in the downlink data time slot, the base station uses a beamforming method to distinguish the transmitted signals sent to multiple terminals so as to reduce the interference between the signals.

The beneficial effects of the present invention are as follows.

The method classifies the uplink time slots according to the synchronization signal received power. Different synchronization signal received power corresponds to different uplink time slots, so that the terminals with the similar received power perform transmitting in the same time slot. In this way, each terminal only needs to implement the adjustment of the transmission power by a smaller amplitude, thereby reducing the implementation cost of the terminal.

The present invention adopts the method of power classification, and the power control is realized with a relatively simple control method while the cost of the terminal is reduced.

The terminal randomly selects the center frequency to transmit the uplink data, and receives the downlink data of the base station on the same frequency. The method effectively reduces the complexity and cost of the terminal: 1) the terminal does not need to accurately select the center frequency, thereby avoiding the complicated frequency correction process on the terminal side; 2) the terminal keeps the center frequency unchanged during the uplink and downlink processes, and meanwhile, the narrow-band single-carrier modulation manner is used, thereby greatly simplifying the terminal circuit design and reducing the implementation cost; 3) the terminal randomly selects the center frequency, so that the probability of collision of the pilot frequencies of multiple terminals (two terminals choose the same center frequency) is greatly reduced, wherein the pilot signal is a single frequency signal, which is favorable for the base station to detect the terminal, and the transmitting failure of the terminal caused by the collision of the pilot frequencies is avoided, which is also favorable to improve the transmitting reliability of the terminal; and 4) both the detection and channel estimation of the terminal are implemented by using Fourier transform, and a fast Fourier transform (FFT) algorithm can be adopted for quick calculation.

DETAILED DESCRIPTION

The present invention is illustrated below with reference to the accompanying drawings.

I. Frame Structure

Figure 1:
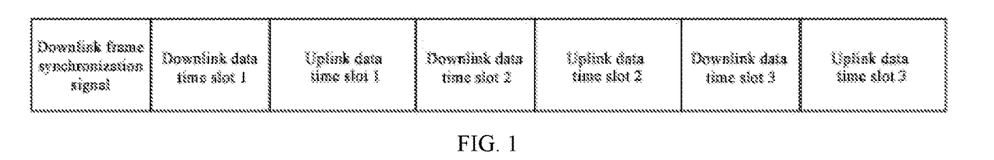
FIG. 1 is a schematic diagram of a frame structure of the present invention.

As shown in FIG. 1, each frame (physical frame) includes one forward downlink frame synchronization signal, a plurality of downlink data time slots, and a plurality of uplink data time slots. A base station transmits a signal to a terminal on downlink, and the terminal transmits a signal to the base station on uplink.

II. Signal Transmitting and Receiving Method

1. The Terminal Receives the Downlink Frame Synchronization Signal.

The downlink frame synchronization signal is a broadcast signal and is sent to all terminals. After the terminal receives the downlink frame synchronization signal, the time and frequency synchronization is performed with reference to the base station (the time and frequency of the terminal are corrected to be consistent with those of the base station), and simultaneously, a synchronization signal received power is evaluated as P. By time synchronization, the terminal acquires the start and end time of each uplink data time slot.

2. The Terminal Sends Uplink Data.

At first, a synchronization signal received power range is defined for all uplink data time slots in the frame, the synchronization signal received power P evaluated by the terminal is compared with the synchronization signal received power range of all uplink data time slots in the frame, all terminals falling into the synchronization signal received power range of the uplink data time slot k select the uplink data time slot k to send data, wherein k is a natural number, and the specific method of comparing the synchronization signal received power P evaluated by the terminal and the synchronization signal received power range of the uplink data time slots is as follows.

A lower limit for the synchronization signal received power is defined for each uplink data time slot in the frame, and the lower limit for the synchronization signal received power of the uplink data time slot k is represented by $\Gamma_k$. Each terminal selects an uplink data time slot k to send data.

When $\Gamma_k$ increases as k increases, $\Gamma_k \leq P \leq \Gamma_{k+1}$.

When $\Gamma_k$ decreases as k increases, if $P \geq \Gamma_1$, the uplink data time slot 1 is selected to send data, and if $P < \Gamma_1$, $\Gamma_k \leq P < \Gamma_{k-1}$.

The uplink time slot is selected on the basis of the synchronization signal received power. Such method reduces the control requirements on the transmitting power of the terminal and can simplify the design and implementation costs of the terminal. The explanation is as follows: the base station simultaneously receives the signals from multiple terminals, and these received signals are required to have similar power. Since the terminals are distributed in different positions, the distances of the terminals from the base station are also different. In order to achieve the similar power, it is necessary for the terminal to be able to adjust the transmitting power thereof in a wide range. Such a process is called power control. The capability of implementing such a wide range of power adjustment will significantly increase the cost of the terminal. Due to the reciprocity between the uplink and the downlink, the synchronization signal received power of the terminal is approximately the signal received power of the base station for the terminal. The method classifies the uplink time slots according to the synchronization signal received power, and selects different uplink time slots for the terminals with different synchronization signal received power to send the data, so that the terminals with the similar synchronization signal received power send the data on the same uplink time slot. In this way, all terminals are only required to adjust the transmitting power within a smaller range, and the requirements of communication between the base station and the multi-user terminals are met, thereby reducing the implementation cost of the communication between the base station and the terminal.

Figure 2:
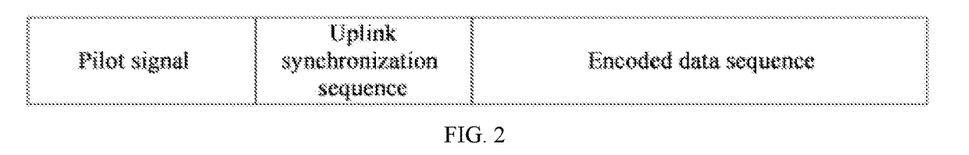
FIG. 2 is a schematic diagram of an uplink data format of a terminal.

In each uplink data time slot, multiple terminals transmit data packets to the base station. Each data packet is modulated by a narrow-band single-carrier modulation manner. The occupied bandwidth is C, and called as a sub-channel, C<B, wherein B is the bandwidth of the entire channel. The terminal randomly selects the center frequency f of the sub-channel within the channel bandwidth B, and modulates the data to the center frequency for transmission by using the narrow-band single-carrier modulation manner. As shown in FIG. 2, the sent signal, that is, the uplink data signal of the terminal includes a pilot frequency signal, an uplink synchronization sequence, and an encoded data sequence. The pilot frequency signal is a fixed single frequency signal with a constant amplitude and a frequency which is the center frequency f of the sub-channel. The uplink synchronization sequence is a sequence with good autocorrelation characteristics and is modulated on the center frequency f of the sub-channel. After complete transmitting, the terminal is handed over to a receiving mode and waits for the response from the base station on the same center frequency f and sub-channel.

The uplink data signal is generated as follows:

1) 16-Bit CRC Check Encoding:

For the data sequence to be sent (0 and 1 bit sequence), 16-bit CRC check encoding is performed, and the check code is supplemented at the end of the data sequence. For example, the polynomial parameter used for generating the CRC check code is 0X8005.

2) Convolutional Encoding and Interleaving:

Convolutional encoding and interleaving are performed on the data sequence to which the CRC check code is added to acquire an encoded data sequence.

Example of convolutional encoding: the (3,1,5) convolutional encoder is used, which output three encoded bits for each bit input. The encoder parameters are [25 33 37].

Figure 4:
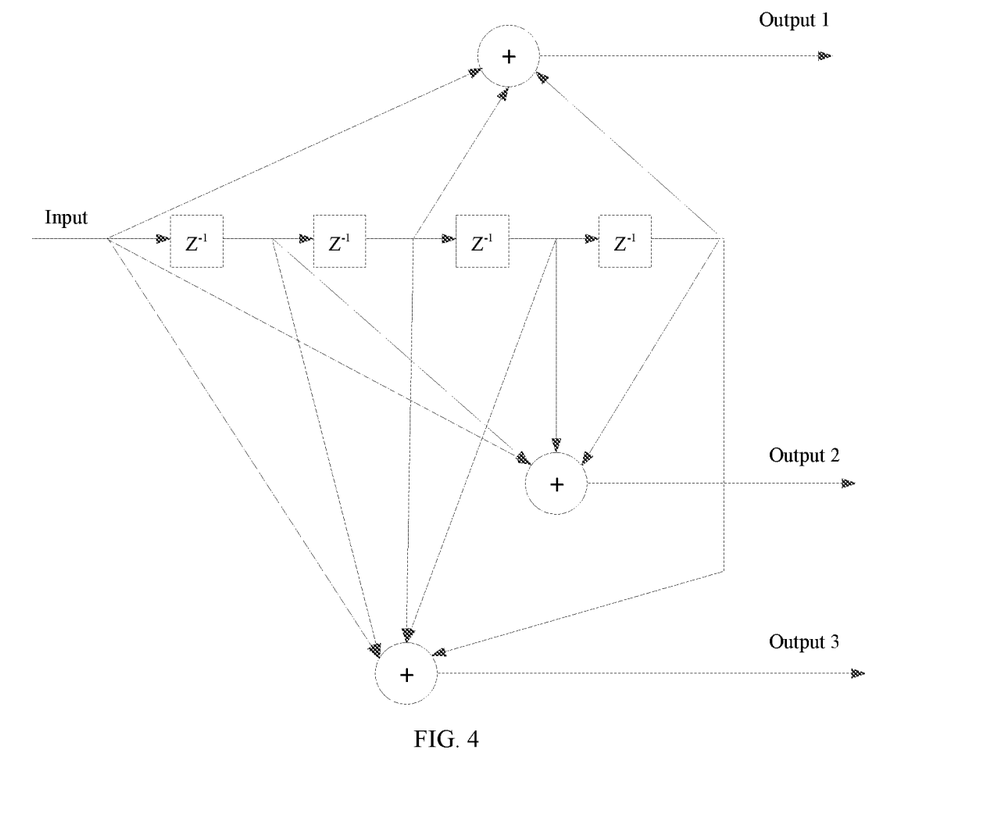
FIG. 4 is a schematic diagram of a convolutional code encoder.
Figure 5:
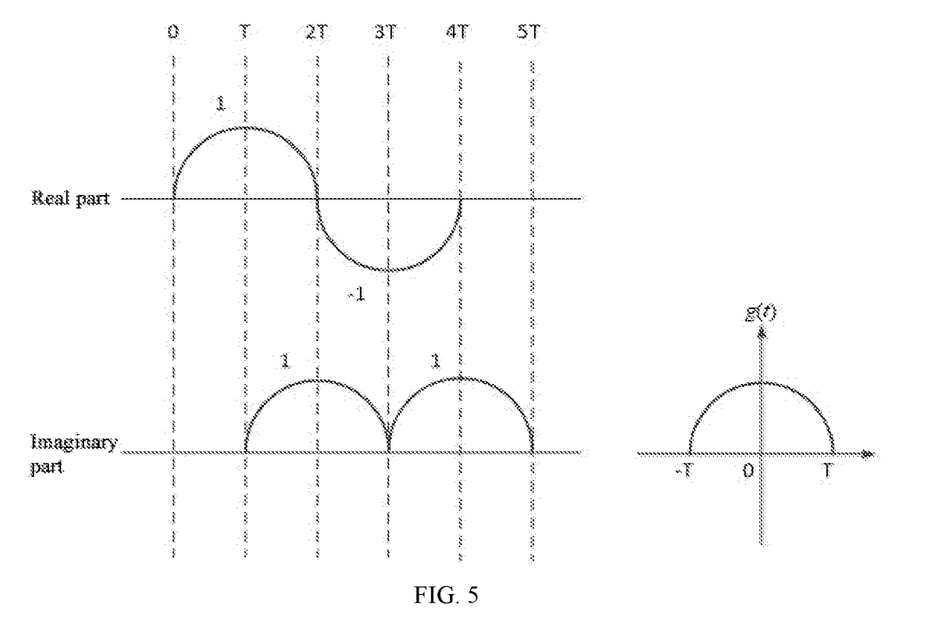
FIG. 5 is a schematic diagram of a real part and an imaginary part of a π/2-BPSK signal.

The structure of the convolutional code encoder is as shown in FIG. 4:

Example of interleaving: block interleaving;

3) The uplink synchronization sequence is added and π/2-BPSK modulation is performed:

Before the uplink synchronization sequence is added to the encoded data sequence, the 0 and 1 bits in the sequence are converted into 1, −1, called as a symbol element. One bit is converted into one symbol element, then π/2-BPSK modulation is performed, and the schematic diagram of the real part and the imaginary part of a π/2-BPSK signal is as shown in FIG. 5.

The modulated signal is:

$S(t)=I(t)\cos(wt)+Q(t)\sin(wt)$, wherein:

$I(t)=A_1 g(t-T)+A_3 g(t-3T)+A_5 g(t-5T)$ $Q(t)=A_2 g(t-2T)+A_4 g(t-4T)+A_6 g(t-6T)$

I(t) and Q(t) represent the two signals in the in-phase and the quadrature branch respectively, $A_1, A_3, A_5$ . . . are the symbol elements in the in-phase branch, and $A_2, A_4, A_6$ . . . are the symbol elements in the quadrature branch. cos(wt) and sin(wt) represent the two carriers in the in-phase and the quadrature branch respectively, t represents time, and w represents the angular frequencies of the two carriers in the in-phase and the quadrature branch. T is equal to one bit-period (i.e., a symbol element period). g(t) represents a symbol element waveform.

4) Addition of Pilot Signal

The pilot signal is added before the modulation signal to form an uplink data signal to be sent, wherein the pilot signal is a single frequency signal.

3. Receiving of Uplink Data by Base Station

1) Acquiring of the Center Frequency of the Sub-Channel of the Terminal

The base station detects the pilot signal sent by the terminal in the uplink data time slot, and acquires the center frequency of the sub-channel of the terminal according to the pilot signal. The base station performs J point Fourier transform (FFT) on the pilot signals received by all the receiving antennas, that is, extracts J sampling points of the pilot signals, and then performs FFT. J is the length of the FFT. The results are represented by $S_1, S_2, \ldots S_M$, and the vector $S_i$ represents the FFT result of the ith antenna branch. The dimension of the vector is: row 1 and column J, and M represents the number of the antennas of the base station. The absolute value of each element of $S_1, S_2, \ldots S_M$ is taken and then squared, and the results of all antenna branches are added up as a vector $$E = \sum_{i=1}^{M} ABS^2(S_i),$$

the dimensions are: row 1 and column J, wherein $ABS^2(S_i)$ indicates that the absolute values of all elements in $S_i$ are taken and then squared. According to the threshold value set by the system, the position of the peak value in E is determined and represented by $n_1, n_2 \ldots, n_K$, wherein K is the number of detected peak values, and each peak value corresponds to one terminal transmitting a signal. According to $$f_k = \begin{cases} \dfrac{n_k - 1}{J} f_s, & 1 \le n_k \le \dfrac{J}{2} \\ \dfrac{J - n_k - 1}{J} f_s, & \dfrac{J}{2} + 1 \le n_k \le J \end{cases},$$

$f_s$ is the system sampling rate, the center frequencies of the sub-channels of all terminals are acquired and represented by $f_1, f_2, \ldots, f_K$.

2) Channel Estimation

Then, the base station performs channel estimation on the terminal. According to the corresponding peak value position $n_k$ of the kth terminal in E, k=1, 2, ..., K, for the FFT results $S_1, S_2, S_M$ of all antenna branches, the $n_k$th elements are taken and combined into a vector $h_k$, which is the channel response of the terminal k to respective antennas of the base station, $$h_k = \begin{bmatrix} (S_1)_{n_k} \\ (S_2)_{n_k} \\ \vdots \\ (S_M)_{n_k} \end{bmatrix},$$

and the dimensions of $h_k$ are: row M, column 1, wherein M is the number of the receiving antennas of the base station and $(S_i)_{n_k}$ represents the $n_k$ th element of the vector $S_i$.

3) Beamforming Receiving

The base station performs beamforming receiving on the terminal, and combines the signals of multiple antennas into one signal. For the kth terminal, according to the channel response $h_k$ of the terminal, a weight vector $w_k$ is acquired, the dimensions are: row 1, column M, wherein M is the number of receiving antennas of the base station. The beamforming receiving is performed on the kth terminal, and the acquired result of the ith sampling point is $x_k(j) = w_k y(j)$, wherein y(J) is the result of the ith sampling point received by each antenna of the base station, and the dimensions of y(i) are row M and column 1.

$w_k$ corresponding to the common beamforming method such as MF (conjugation beamforming) and ZF (zero forcing beamforming) is as follows:

MF method: $w_k = h_k^H$, wherein the superscript H represents the conjugation transpose of the matrix/vector.

ZF method: $w_k = [G]_{k_1+1}$, $G = (H^H H)^{-1} H^H$, $H = [h_{k-k_1} \ldots h_k \ldots h_{k+k_2}]$, and H represents the channel response matrix of all terminals in the sub-channel where the kth terminal is located.

4) Channelization:

The base station performs bandpass filtering and down-conversion on the beamformed signals $x_k(j)$ of each terminal according to the center frequencies $f_1, f_2, \ldots, f_K$ of the sub-channels of respective terminals, and the acquired received baseband signal is represented by $z_k(j)$.

5) Data Recovery

Then, the uplink synchronization sequence is searched in the baseband signal sequence $z_k(j)$, j=1, 2, 3 ... to achieve time synchronization with the terminal, and finally the data sent by the terminal is recovered. The process of data recovering is the reverse process of data transmitting, including the steps such as demodulation, deinterleaving, decoding and CRC check.

4. Transmitting of Downlink Data by Base Station

In each downlink data time slot, the base station transmits data packets to multiple terminals. Each data packet is modulated by the narrow-band single-carrier modulation manner, and the occupied bandwidth is C and called as a sub-channel. The center frequency of the sub-channel is the center frequency of the sub-channel used by the terminal during the last uplink transmission. In addition to distinguishing the transmitted signals to multiple terminals by the center frequency of the sub-channel, the base station also uses the beamforming method to distinguish the signals sent to multiple terminals to reduce interference between these signals. The transmitted signal includes a downlink synchronization sequence and an encoded data sequence. The downlink synchronization sequence is a sequence with good autocorrelation characteristics and is modulated on the center frequency of the sub-channel of the terminal.

The terminal randomly selects a center frequency to transmit the uplink data, and receives the downlink data of the base station on the same frequency. The method effectively reduces the complexity and cost of the terminal: 1) the terminal does not need to accurately select the center frequency, thereby avoiding the complicated frequency correction process on the terminal side; 2) the terminal keeps the center frequency unchanged during the uplink and downlink processes, and meanwhile, the narrow-band single-carrier modulation manner is used, thereby greatly simplifying the terminal circuit design and reducing the implementation cost; 3) the terminal randomly selects the center frequency, so that the probability of collision of the pilot frequencies of multiple terminals (two terminals choose the same center frequency) is greatly reduced, wherein the pilot signal is a single frequency signal, which is favorable for the base station to detect the terminal, and the transmitting failure of the terminal caused by the collision of the pilot frequencies is avoided, which is also favorable to improve the transmitting reliability of the terminal; and 4) both the detection and channel estimation of the terminal are implemented by using FFT, and quick calculation can be realized by using the fast Fourier transform algorithm.

Figure 3:
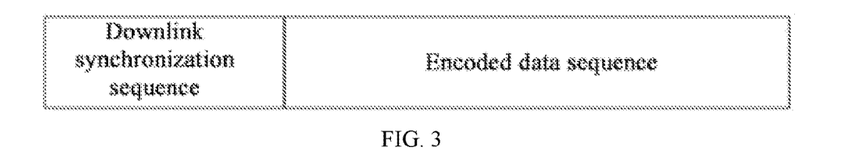
FIG. 3 is a schematic diagram of a downlink data format.

The downlink data format is as shown in FIG. 3 below.

Generation of Downlink Data Signal:

1) 16-Bit CRC Check Encoding:

For the data sequence to be sent (0 and 1 bit sequence), 16-bit CRC check encoding is performed, and the check code is supplemented at the end of the data sequence.

2) Convolutional Encoding and Interleaving:

Convolutional encoding and interleaving are performed on the data sequence to which the CRC check code is added to acquire an encoded data sequence.

Example of interleaving: block interleaving; 3) the downlink synchronization sequence is added and π/2-BPSK modulation is performed:

Before the downlink synchronization sequence is added to the encoded data sequence, the 0 and 1 bits in the sequence are converted into 1, −1, called as a symbol element, one bit is converted into one symbol element, and then π/2-BPSK modulation is performed.

4) Downlink Beamforming and Transmitting

The jth sampling point of the signal to be sent by the base station to the k th terminal is $q_k(j)$. The downlink beamforming multiplies $q_k(j)$ by the weight vector $w_k^T$ corresponding to the kth terminal, wherein the superscript T represents the transpose of the matrix/vector, and $w_k^T q_k(j)$ is acquired with dimensions of row M and column 1. By the base station, the data from the first to last rows of $w_k^T q_k(j)$ are corresponded to the first to last antennas of the base station for transmitting.

5 Some Variations

The above downlink frame synchronization signal is a LoRa signal.

The above narrow-band single-carrier modulation is MSK, GMSK, OQPSK or π/12-BPSK.

The invention claimed is:

1. A signal transmission method for a multi-antenna multi-user time division duplex (TDD) communication system, wherein each frame of the TDD communication system comprises one forward downlink frame synchronization signal, multiple downlink data time slots, and multiple uplink data time slots;

the downlink frame synchronization signal is a broadcast signal, a base station sends the downlink frame synchronization signal to all terminals, after each terminal receives the downlink frame synchronization signal, time and frequency synchronization is performed with reference to the base station, a synchronization signal received power P is evaluated simultaneously; by time synchronization, each terminal acquires the start and end time of each uplink data time slot, afterwards, according to the evaluated synchronization signal received power P, each terminal selects one uplink data time slot k to send data, wherein k is a natural number, and the specific selecting method is as follows:

a lower limit for the synchronization signal received power is predetermined for each uplink data time slot in the frame, and the lower limit for the synchronization signal received power of the uplink data time slot k is represented by $\Gamma_k$;

in the case that $\Gamma_k$ increases as k increases, slot k is selected if $\Gamma_k \leq P < \Gamma_{k+1}$;

in the case that $\Gamma_k$ decreases as k increases, if $P \geq \Gamma_1$, the uplink data time slot 1 is selected to send data, and if $P < \Gamma_1$, and slot k is selected if $\Gamma_k \leq P < \Gamma_{k-1}$;

wherein the above $\Gamma_k$ is a predetermined constant number for each uplink data time slot in the frame, and $\Gamma_k$ is acquired by statistics and optimization by simulation or actual measurement.

2. The signal transmission method for a multi-antenna multi-user TDD communication system according to claim 1, wherein in each uplink data time slot, multiple terminals transmit data packets to the base station, and each data packet is modulated by adopting a narrow-band single-carrier modulation manner; and the format in which the terminal transmits the data in the uplink data time slot is a pilot signal plus an uplink synchronization sequence plus an encoded data sequence, wherein the pilot signal is a single frequency signal and the uplink synchronization sequence is a sequence with good autocorrelation characteristics.

3. The signal transmission method for a multi-antenna multi-user TDD communication system according to claim 2, wherein the uplink synchronization sequence and the encoded data sequence are both modulated by any method of MSK, GMSK, OQPSK, and π/2-BPSK.

4. The signal transmission method for a multi-antenna multi-user TDD communication system according to claim 1, wherein the data packets transmitted between the base station and the terminals in the uplink data time slots and the downlink data time slots are both modulated by adopting a narrow-band single-carrier modulation manner, and the terminal randomly selects a center frequency to transmit uplink data, and receives the downlink data of the base station on the same center frequency.

5. The signal transmission method for a multi-antenna multi-user TDD communication system according to claim 2, wherein the base station detects the pilot signal sent by the terminal in the uplink data time slot, and acquires the center frequency of a sub-channel of the terminal according to the pilot signal, and the specific acquiring method is as follows: the base station performs J point Fourier transform (FFT) on the pilot signals received by all antennas and records the FFT result of the $i^{th}$ antenna branch as vector $S_i$, the absolute value of the FFT result of each antenna receipt is calculated and then squared, afterwards, the results of all antenna branches are added up as $$E = \sum_{i=1}^{M} \mathrm{ABS}^2(S_i),$$

wherein $\mathrm{ABS}^2(S_i)$ represents that the absolute values of all elements in $S_i$ are taken and then squared; then according to the threshold value set by the system, the position of the peak value in E is calculated, and is represented by $n_1$, $n_2 \ldots, n_k$, wherein K is the number of detected peak values; each peak value corresponds to one terminal transmitting a signal, and then the center frequency of the sub-channel of each terminal is acquired according to the following formula $$f_k = \begin{cases} \dfrac{n_k - 1}{J} f_s, & 1 \leq n_k \leq \dfrac{J}{2} \\ \dfrac{J - n_k - 1}{J} f_s, & \dfrac{J}{2} + 1 \leq n_k \leq J \end{cases},$$

wherein $f_s$ is the system sampling rate, and the acquired center frequencies of the sub-channels of respective terminals are represented by $f_1, f_2 \ldots, f_k$.

6. The signal transmission method for a multi-antenna multi-user TDD communication system according to claim 5, wherein the method for the base station to perform channel estimation on the terminal is as follows:

according to the corresponding peak value position $n_k$ of the kth terminal in E, k=1,2, . . . , K, k is a natural number, for the FFT results $S_1$, $S_2$, . . . , $S_M$ of all antenna branches, the $n_k$-th elements are taken and combined into a vector $h_k$, which is the channel response of the terminal k to each antenna of the base station, $$h_k = \begin{bmatrix} (S_1)_{n_k} \\ (S_2)_{n_k} \\ \vdots \\ (S_M)_{n_k} \end{bmatrix},$$

the dimensions of $h_k$ are: M rows and 1 column, wherein M is the number of the receiving antennas of the base station, and $(S_i)_{n_k}$ represents the $n_k$th element of the vector $S_i$.

7. The signal transmission method for a multi-antenna multi-user TDD communication system according to claim 6, wherein in the receiving process that the base station performs beamforming to the terminal, the beamforming is performed by adopting any method of conjugation beamforming, zero forcing beamforming or minimum mean square error beamforming according to the channel response of the terminal.

8. The signal transmission method for a multi-antenna multi-user TDD communication system according to claim 7, wherein in each downlink data time slot, the base station transmits data packets to multiple terminals, each data packet is modulated by adopting a narrow-band single-carrier modulation manner, the occupied bandwidth is C and called as a sub-channel, the center frequency of the sub-channel is the center frequency of the sub-channel used by the terminal during the last uplink transmission, and the base station distinguishes the transmitted signals for multiple terminals by the center frequency of the sub-channel, and reduces the interference between the signals; and in each downlink data time slot, the data packet sent by the base station consists of a downlink synchronization sequence and an encoded data sequence, wherein the downlink synchronization sequence is a sequence with good autocorrelation characteristics, and modulated on the center frequency of the sub-channel of the corresponding terminal.

9. The signal transmission method for a multi-antenna multi-user TDD communication system according to claim 8, wherein in the downlink data time slot, the base station uses a beamforming method to distinguish the transmitted signals sent to multiple terminals so as to reduce the interference between the signals.

* * * * *